United States Patent
Iso et al.

(10) Patent No.: US 7,514,118 B2
(45) Date of Patent: Apr. 7, 2009

(54) METHOD OF ELECTROLESS PLATING ON A GLASS SUBSTRATE AND METHOD OF MANUFACTURING A MAGNETIC RECORDING MEDIUM USING THE METHOD OF ELECTROLESS PLATING

(75) Inventors: Akira Iso, Minami-Alps (JP); Youichi Tei, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 330 days.

(21) Appl. No.: 11/288,451

(22) Filed: Nov. 29, 2005

(65) Prior Publication Data
US 2006/0134325 A1    Jun. 22, 2006

(30) Foreign Application Priority Data
Dec. 14, 2004    (JP)    ............................... 2004-361115

(51) Int. Cl.
*B05D 5/12*    (2006.01)
(52) U.S. Cl. ........................ 427/127; 427/128; 427/129; 427/130; 427/131; 427/305; 428/831; 428/846.8
(58) Field of Classification Search ................ 427/127, 427/128, 129, 130, 131, 132, 165, 305; 428/831, 428/848.8
See application file for complete search history.

(56) References Cited

U.S. PATENT DOCUMENTS

| | | | | |
|---|---|---|---|---|
| 4,804,410 A | * | 2/1989 | Haga et al. ................. | 106/1.15 |
| 6,127,052 A | * | 10/2000 | Tomari et al. ............... | 428/680 |
| 6,261,671 B1 | * | 7/2001 | Asai et al. .................... | 428/206 |
| 6,926,977 B2 | * | 8/2005 | Osawa et al. ............. | 428/832.1 |
| 2002/0192379 A1 | * | 12/2002 | Imori .......................... | 427/304 |
| 2004/0265641 A1 | * | 12/2004 | Ishii et al. ................ | 428/694 T |

FOREIGN PATENT DOCUMENTS

| | | |
|---|---|---|
| JP | 08-039728 | 2/1996 |
| JP | 2000-163743 | 6/2000 |

OTHER PUBLICATIONS

Machine translation (partial) of JP 08-039728; 2008; JPO; pp. 1-5.*

* cited by examiner

*Primary Examiner*—Alain L Bashore
(74) *Attorney, Agent, or Firm*—Rabin & Berdo, P.C.

(57) ABSTRACT

A method of plating on a glass substrate allowing an electroless plating film with good adhesiveness to be formed by chemically bonding a silane coupling agent in a state of simple adhesion or hydrogen bond to the surface of the glass substrate through dehydration condensation reaction, and a method of manufacturing a magnetic recording medium using the plating method. In the plating method, electroless plating is performed on a glass substrate after sequentially conducting at least the adhesion layer formation that forms an adhesion layer using a silane coupling agent solution, catalyst layer formation, a catalyst activation, and a drying that chemically bonds the silane coupling agent in the adhesion layer to the surface of the glass substrate.

20 Claims, 2 Drawing Sheets

METHOD OF ELECTROLESS PLATING ON A GLASS SUBSTRATE AND METHOD OF MANUFACTURING A MAGNETIC RECORDING MEDIUM USING THE METHOD OF ELECTROLESS PLATING

CROSS-REFERENCE TO RELATED APPLICATION

This application is based on, and claims priority to, Japanese Application No. 2004-361115, filed on Dec. 14, 2004, the contents of which are incorporated herein by reference.

BACKGROUND OF THE INVENTION

1. Field of the Invention

The invention relates to a method of plating on a glass substrate and a method of manufacturing a magnetic recording medium using the method of plating. The method of plating is useful in particular for the formation of an electroless plating film on a glass substrate for a magnetic recording medium installed in a hard disk drive.

2. Description of the Related Art

In magnetic recording media (hard disks: HDs) installed in hard disk drives (HDDs) used in external storage devices of computers, a glass substrate exhibiting superior flatness and strength than an aluminum alloy substrate has become more popular to meet demands for large storage capacity suited to installation in AV appliances, and for higher recording density on decreased diameter HDs.

An aluminum alloy substrate normally has a NiP plating film formed on it by means of an electroless plating method. For a glass substrate, on the other hand, forming a plating film on it with satisfactory adhesiveness by means of the electroless plating method, has been technologically difficult.

A technique may be possible, in which an adhesion layer is formed on a glass substrate by sputtering. According to this technique, the adhesive layer is composed of a layer containing titanium or chromium that exhibits relatively good adhesion with glass in the metallic substances. On the adhesion layer, a desired film is laminated. The technique, however, requires repetition of processing for each of multiple laminations, and therefore finds difficulty in cost reduction as compared with a plating method, which allows batch processing. Thus, the technique is not suited to form a thick film. In particular, a perpendicular magnetic recording medium, which is a subject of active development, needs a relatively thick layer, a soft magnetic underlayer having a thickness of 0.3 to 3.0 μm. Such a thick layer can only be obtained at high cost when deposition is performed by a sputtering method.

A method to form a plating film on a surface of a glass substrate by means of an electroless plating method has been proposed in Japanese Unexamined Patent Application Publication No. 2000-163743, in which an adhesion layer is formed of a silane coupling agent and an electroless plating film is formed on the adhesion layer.

In this method, the ethoxyl group or methoxyl group in the silane coupling agent becomes a silanol group when the silane coupling agent dissolves in water, and the silanol group bonds through the hydrogen bond to the hydroxyl group or silanol group generated by activation of the surface of the glass substrate. After a dehydration treatment is performed, adhesion through a firm chemical bond is accomplished. Consequently, a plating film with good adhesiveness is yet obtained on a smooth substrate surface without utilizing an anchoring effect by surface coarsening as in a sensitization-activation method.

Japanese Unexamined Patent Application Publication No. H8-39728 discloses a method in which a silane coupling agent solution is applied to a glass epoxy substrate for a printed wiring board and dried. The substrate then is plated with a metal in the presence of a metallizing catalyst.

In the above-described method using the adhesion layer of silane coupling agent, it is important that the state of combination between the hydroxyl groups on the glass substrate and the silanol groups of the silane coupling agent is a chemical bond. The existence of a portion not chemically bound, but in a simple adhesion of a hydrogen bond, has been found to cause poor adhesion, blisters, and peeling of the plated film. The state of combination can be made into chemical bonds in some extent by an activation treatment on the surface of the glass substrate, but it is difficult to entirely establish chemical bonding.

SUMMARY OF THE INVENTION

In view of the above problems, an object of the invention is to provide a method of plating on a glass substrate, the method forming an electroless plating film with good adhesiveness by chemically bonding a silane coupling agent that initially is in a state of simple adhesion or initially hydrogen bonded to a glass substrate through a dehydration/condensation reaction. Another object of the invention is to provide a method of manufacturing a magnetic recording medium using this plating method.

To accomplish the above objects, a method of plating on a glass substrate according to the invention includes the steps of an adhesion layer formation treatment that forms an adhesion layer using a silane coupling agent solution, a catalyst layer formation treatment, a catalyst activation treatment, and a drying treatment that makes the silane coupling agent in the adhesion layer chemically bond to a surface of the glass substrate, sequentially performed on the surface of the glass substrate. Following these steps electroless plating is performed.

The catalyst layer formation treatment preferably is conducted using a palladium catalyst. The catalyst activation treatment preferably is conducted using hypophosphorous acid.

Advantageously, the method of plating further includes an acid cleaning treatment between the catalyst activation treatment and the drying treatment. Alternatively, the method of plating can include the sequentially conducted steps of an intermediate drying treatment and an acid cleaning treatment between the catalyst activation treatment and the drying treatment before the step of electroless plating. Advantageously, the treatments from the adhesion layer formation treatment to the step of the acid cleaning treatment are repeatedly.

The acid cleaning treatment preferably is conducted using an acid solution with a pH of 2 or more containing at least hydrofluoric acid. The drying treatment is preferably a heated drying treatment performed at a temperature of at least 60° C. and lower than 200° C.

A method of manufacturing a magnetic recording medium of the invention includes electroless plating on a glass substrate according to the method of plating of the invention and forming at least a magnetic recording layer on a film by the electroless plating.

Because a drying treatment is performed after the treatments of adhesion layer formation up through catalyst activation in the method of the invention, a silane coupling agent of the adhesion layer initially in a state of simple adhesion or initially hydrogen bonded to the glass substrate surface chemically bonds to the glass substrate through a dehydration condensation reaction between the silanol groups in the silane coupling agent and the hydroxyl groups on the glass substrate surface.

Providing heat during the drying treatment can shorten the time of drying. Though a temperature of at least 80° C. and duration of at least 5 min are enough, a temperature below 200° C. is appropriate for avoiding oxidation of a catalyst of palladium.

The portion lacking a hydroxyl group on the glass substrate surface, for example a portion of the surface having an alkali component contained in the glass, cannot develop a chemical bond by unheated air drying or heated, drying. So, a drying treatment cannot make all of the silane coupling agent chemically bond completely. The silane coupling agent that is not chemically bonded to the glass substrate, however, can be removed after the unheated air drying or heated drying, by means of acid cleaning with hydrofluoric acid or an acid solution containing hydrofluoric acid. Because the acid here could break the chemical bond if the pH of the acid is less than 2, the cleaning preferably is carried out using an acid exhibiting a pH value of 2 or higher.

The acid cleaning treatment could decrease the number of catalytic nuclei, which would deteriorate the plating quality. So, for increasing the number of catalytic nuclei, it is advantageous to repeat the sequence of treatments of adhesion layer formation, catalyst layer formation, catalyst activation, drying, and acid cleaning. The acid cleaning is effective even when omitting the intermediate drying treatment after the catalyst activation treatment. But, the number of repetitions of the treatments from the adhesion layer formation to the acid cleaning must be increased in that case.

The method of plating on a glass substrate according to the invention allows forming an electroless plating film that has no blisters, exhibits good surface appearance, and has excellent adhesion on a glass substrate.

As a result, a magnetic recording medium with excellent adhesion is obtained by performing electroless plating on a glass substrate according to the method of plating of the invention and forming a magnetic layer on that electroless plating film. Especially, a soft magnetic plating film formed by the method of plating of the invention provides a perpendicular magnetic recording medium using a glass substrate exhibiting good soft magnetic performance and adhesion.

The following describes some preferred embodiments of the invention with reference to the accompanied drawings.

DETAILED DESCRIPTION OF THE PREFERRED EMBODIMENTS

Method of Plating on a Glass Substrate

Figure 1:
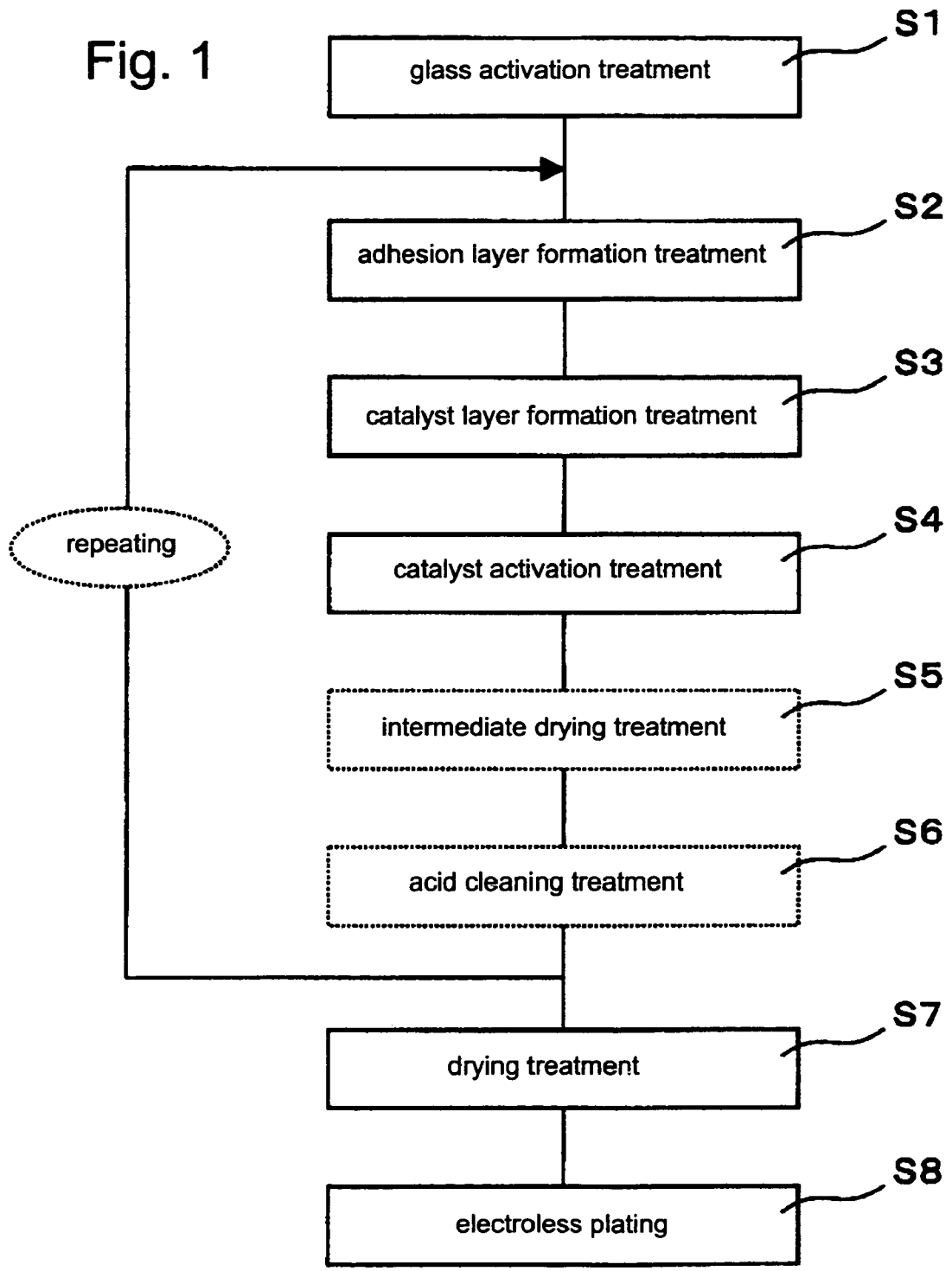
FIG. 1 shows a procedure in an embodiment of a method of plating on a glass substrate according to the invention.

FIG. 1 illustrates processes in a basic embodiment of a method of plating on a glass substrate according to the invention. As shown in FIG. 1, the method of plating on a glass substrate in the illustrated embodiment includes surface treatment steps, including a glass activation step S1, an adhesion layer formation step S2, a catalyst layer formation step S3, a catalyst activation step. S4, an intermediate drying step S5, an acid cleaning step S6, and a drying step S7 as pre-treatment steps for electroless plating step S8.

Of the steps, the intermediate drying step S5 and the acid cleaning step S6 can be omitted. When the acid cleaning step S6 is performed, the adhesion layer formation step S2 through the acid cleaning step S6 preferably are repeated. In that case, if the intermediate drying treatment step S5 is omitted, the number of repetitions is necessarily increased. The following describes the first to fifth embodiments of the method, which include different combinations of these steps and variations in ways they are carried out.

First Embodiment

The first embodiment consists of glass activation step S1, adhesion layer formation step S2, catalyst layer formation step S3, catalyst activation step S4, drying step S7, and electroless plating step S8 of the steps shown in FIG. 1.

The glass activation step S1 is included in this embodiment because the glass substrate surface is advantageously cleaned and activated in advance in order to chemically bond the silane coupling agent of the adhesion layer to the glass substrate.

For this activation, the glass substrate preferably is subjected to acid etching on the glass substrate surface by dipping it in an aqueous solution of hydrofluoric acid (HF), for example. This acid etching removes the existing old inactive oxide film on the glass substrate and forms a new oxide film, increasing the number of hydroxyl groups that bond to the silane coupling agent. Further, sequential pretreatments for this acid etching preferably are performed, including alkali degreasing using an aqueous solution of potassium hydroxide (KOH) or the like and a surface oxidation treatment using an aqueous solution of sulfuric acid ($H_2SO_4$) or the like. After each treatment step, the glass substrate is rinsed with pure water and transferred to the next treatment step without drying.

The adhesion layer formation step S2 applies and forms an adhesion layer by dipping the glass substrate, after the glass activation, in an aqueous solution of a silane coupling agent. The glass substrate is rinsed with pure water after the dipping process, and transferred to the next step without drying.

A silane coupling agent for use in forming the adhesion layer can be an amino-silane coupling agent, for example formulation KBE 903, KBM 903, KBE 603, or KBM 603 manufactured by Shin-Etsu Chemical Co., Ltd.

The catalyst layer formation step S3 applies and forms a catalyst layer to work as a catalyst for electroless plating by dipping the glass substrate having the adhesion layer formed thereon in a palladium catalyst solution, preferably an aqueous solution of palladium chloride ($PdCl_2$). The glass substrate is rinsed with pure water after the dipping process, and transferred to the next treatment step without drying.

The catalyst activation step S4 removes the excessive palladium and activates the catalyst layer formed from the applied palladium catalyst solution by dipping the glass substrate having the catalyst layer formed thereon, preferably in an aqueous solution of hypophosphorous acid ($H_3PO_2$). The glass substrate is rinsed with pure water after the dipping process, and transferred to the next treatment step without drying The drying step S7 includes drying the glass substrate with unheated air after the catalyst activation. The drying can serve to provide dehydration condensation to form a chemical bond between the silanol groups in the silane coupling agent of the adhesion layer in a state of simple adhesion or hydrogen bond to the glass substrate surface and the hydroxyl groups on the glass substrate surface. A state of sufficient chemical bonding can be developed by extending the drying time beyond the minimum necessary time.

The electroless plating step S8 forms a plating film by means of an electroless plating method utilizing the catalyst layer as a catalyst, by dipping the glass substrate in a known electroless plating solution after the drying. The composition of the plating film is not limited to a special substance, and can be, for example, a soft magnetic film or a nonmagnetic film such as a CoNiP film or a NiP film for use in a magnetic recording media.

Second Embodiment

The second embodiment consists of a glass activation step S1, adhesion layer formation step S2, catalyst layer formation step S3, catalyst activation step S4, drying step S7, and electroless plating step S8 of the steps shown in FIG. 1.

This second embodiment is the same as the first embodiment except that the drying treatment in the drying step S7 is heated drying. The heated drying treatment is preferably conducted at a temperature at least 60° C. and below 200° C.

Third Embodiment

The third embodiment consists of glass activation step S1, adhesion layer formation step S2, catalyst layer formation step S3, catalyst activation step S4, intermediate drying step S5, acid cleaning step S6, drying step S7, and electroless plating step S8 of the steps shown in FIG. 1.

This third embodiment is the same as the first embodiment except that an intermediate drying step S5 and an acid cleaning step S6 are conducted between the catalyst activation step S4 and the drying step S7. The intermediate drying step S5 includes unheated air drying on the glass substrate after the catalyst activation treatment to chemically bond the silane coupling agent of the adhesion layer to the glass substrate.

The acid cleaning step S6 includes acid cleaning with hydrofluoric acid or an acid solution containing hydrofluoric acid to remove the silane coupling agent not chemically bound with the glass substrate. Because this acid cleaning step S6 would decrease the number of catalyst nuclei and degrade plating quality, the steps of the adhesion layer formation step S2 through the acid cleaning step S6 are preferably repeated a number of times.

Fourth Embodiment

The fourth embodiment consists of an glass activation step S1, adhesion layer formation step S2, catalyst layer formation step S3, catalyst activation step S4, intermediate drying step S5, acid cleaning step S6, drying step S7, and electroless plating step S8 as shown in FIG. 1.

The fourth embodiment is the same as the third embodiment except that the drying treatment of the intermediate drying step S5 is heated drying.

Fifth Embodiment

The fifth embodiment consists of the glass activation step S1, adhesion layer formation step S2, catalyst layer formation step S3, catalyst activation step S4, acid cleaning step S6, drying step S7, and electroless plating step S8 shown in FIG. 1.

The fifth embodiment is the same as the third embodiment except that the intermediate drying step S5 is omitted.

Because this fifth embodiment does not include the intermediate drying step S5 for chemically bonding the silane coupling agent of the adhesion layer to the glass substrate, the number of repetitions of the steps of adhesion layer formation step S2 through the acid cleaning step S6 must be increased as compared with in the third embodiment.

Method of Manufacturing a Magnetic Recording Medium

A method of manufacturing a magnetic recording medium according to the invention is as follows. First, a soft magnetic plating film of CoNiP, for example, is formed on a glass substrate of a disk shape by means of electroless plating according to a method of plating on a glass substrate as described above.

As necessary, the surface of the plated film is polished, worked to flatness and textured, and then cleaned and dried. On the substrate, for example, a nonmagnetic underlayer of chromium, a magnetic recording layer of Co—Cr—Pt—$SiO_2$ and a protective layer of carbon are sequentially deposited employing a sputtering method.

Thus, a perpendicular magnetic recording medium provided with a soft magnetic backing layer of a soft magnetic plating film formed by an electroless plating method is manufactured employing a glass substrate. According to the above-described embodiment of the invention, since the soft magnetic plating film formed on the glass substrate does not generate blisters and has a good appearance, the perpendicular magnetic recording medium exhibits good soft magnetic properties and adhesiveness.

EXAMPLES

The following describes some specific examples of the above-described embodiments of the invention.

Examples of the Method of Plating on a Glass Substrate

The Examples 1 through 5 described below are specific examples of the embodiments of the method of plating on a glass substrate corresponding respectively to the first to fifth embodiments of the invention as described above. The conditions for the drying steps and acid cleaning are Condition 1 to Condition 28 given below in Table 1.

Example 1

In Example 1, the method of the above-described first embodiment was performed under conditions 1 through 5 in Table 1 as described below.

Condition 1

(Glass Activation Step S1)

(1) Etching Process 1 (Alkali Degreasing)

A glass substrate was dipped in an aqueous solution of potassium hydroxide. A treatment liquid was prepared by adding 2,700 g of KOH to 36 L of pure (e.g. distilled) water and heating the liquid to 50° C. The glass substrate was dipped in the liquid for 3 minutes while rotating the substrate at 20 rpm for homogeneous treatment of its surface. The substrate was then thoroughly rinsed with pure water and, without drying, transferred to the next process.

(2) Etching Process 2 (Surface Oxidation)

Subsequently, the glass substrate was dipped in an aqueous solution of sulfuric acid. The aqueous solution was prepared by adding 36 mL of sulfuric acid to 36 L of pure water. The glass substrate was dipped in the liquid for 3 minutes while rotating the substrate at 20 rpm for homogeneous treatment of its surface. The substrate then was thoroughly rinsed with pure water and, without drying, transferred to the next process.

(3) Etching Process 3 (Anchoring Effect and Activation Treatment)

Subsequently, the glass substrate was dipped in an aqueous solution of hydrofluoric acid. An aqueous solution was prepared by adding 9 mL of hydrofluoric acid to 36 L of pure water. The glass substrate was dipped in this solution for 3 minutes while rotating the substrate at 20 rpm for homogeneous treatment of its surface. The substrate then was thoroughly rinsed with pure water and, without drying, transferred to the next process.

(Adhesion Layer Formation Step S2)

Subsequently, the glass substrate was dipped in an aqueous solution of silane coupling agent. The aqueous solution was prepared by adding 720 mL of KBE 603 (manufactured by Shin-Etsu Chemical Co., Ltd.) to 36 L of pure water. The substrate was dipped in the solution for 10 minutes while rotating the substrate at 20 rpm for homogeneous treatment of its surface. The substrate then was thoroughly rinsed with pure water and, without drying, transferred to the next process.

(Catalyst Layer Formation Step S3)

Subsequently, the glass substrate was dipped in an aqueous solution of palladium chloride. The aqueous solution was prepared by adding 1,080 mL of Activator 7331 (manufactured by Meltex Inc.) and 54 mL of KOH to a concentration of 0.1 mol/L into 36 L of pure water. The substrate was dipped in the solution for 10 minutes while rotating the substrate at 20 rpm for homogeneous treatment of its surface. The substrate then was thoroughly rinsed with pure water and, without drying, transferred to the next process.

(Catalyst Activation Step S4)

Subsequently, the glass substrate was dipped in an aqueous solution of hypophosphorous acid. The aqueous solution was prepared by adding 360 mL of PA 7340 (manufactured by Meltex Inc.) to 36 L of pure water. The substrate was dipped in the liquid for 2 minutes while rotating the substrate at 20 rpm for homogeneous treatment of its surface. The substrate then was thoroughly rinsed with pure water and, without drying, transferred to the next process.

(Drying Step S7)

Subsequently, the substrate was transferred to the next process (electroless plating) without performing any heated or unheated drying treatment.

(Electroless Plating Step S8)

Next, a CoNiP film, 2 μm thick, was deposited by means of electroless plating. The composition of the plating solution was 5 g/L of cobalt sulfate 7 hydrate, 5 g/L of nickel sulfate 6 hydrate, 20 g/L of sodium hypophosphite, 60 g/L of sodium citrate, 30 g/L of boric acid, and 1 ppm of 1,000 ppm lead nitrate; and the total volume of the plating bath was 75 L. The plating bath was at a temperature of 85° C. and regulated to pH 8 with sodium hydroxide. The substrate was dipped while rotating at 20 rpm to obtain a homogeneous plating film.

Condition 2

Condition 2 was the same as Condition 1 except that an unheated air drying treatment (see step S7 above) was performed for 0.5 hour.

Condition 3

Condition 3 was the same as Condition 2 except that step 7 was an unheated air drying treatment, performed for 1 hour.

Condition 4

Condition 4 was the same as Condition 2 except that step 7 was an unheated air drying treatment, performed for 6 hours.

Condition 5

Condition 5 was the same as Condition 2 except that step 7 was an unheated air drying treatment, performed for 12 hours.

Example 2

In Example 2, the method of the above-described second embodiment was performed under conditions 6 through 11 in Table 1 below.

Condition 6

Condition 6 was the same as Condition 1 except that the drying step S7 was performed at a temperature of 60° C. and for duration of 5 minutes.

Condition 7

Condition 7 was the same as Condition 6 except that the drying step was a heated drying treatment having a duration of 10 minutes.

Condition 8

Condition 8 was the same as Condition 6 except that the drying step was performed at a temperature of 80° C.

Condition 9

Condition 9 was the same as Condition 6 except that the drying step was performed at a temperature of 100° C.

Condition 10

Condition 10 was the same as Condition 6 except that the drying step was performed at a temperature of 150° C.

Condition 11

Condition 11 was the same as Condition 6 except that the drying step was performed at a temperature of 200° C.

Example 3

In the Example 3, the above-described third embodiment was conducted under conditions 12 through 15 in Table 1.

Condition 12

In the condition 12, the intermediate drying treatment step S5 was 12 hours of unheated air drying and the acid cleaning step S6 was dipping the glass substrate in an aqueous solution of hydrofluoric acid with a concentration of 0.025% for 3 minutes while rotating the substrate at 20 rpm to achieve homogeneous treatment. The substrate after the above process was rinsed thoroughly with pure water and air dried for 12 hours in the drying step S7. After that, electroless plating was performed in an electroless plating step S8. Other processes were the same as in Condition 5.

Condition 13

Condition 13 was the same as Condition 12 except that the steps of the adhesion layer formation step S2 through the acid cleaning step S6 were repeated twice.

Condition 14

Condition 14 was the same as Condition 12 except that the steps of the adhesion layer formation step S2 through the acid cleaning step S6 were repeated three times.

Condition 15

Condition 15 was the same as Condition 12 except that the steps of the adhesion layer formation step S2 through the acid cleaning step S6 were repeated four times.

Example 4

In Example 4, the above-described fourth embodiment was performed under conditions 16 through 22 in Table 1.

Condition 16
Condition 16 was the same as Condition 12 except that the drying treatment in the intermediate drying step S5 was a heated drying treatment performed at 80° C. for 5 minutes.

Condition 17
Condition 17 was the same as Condition 16 except that the concentration of the aqueous solution of hydrofluoric acid in the acid cleaning step S6 was 0.05%.

Condition 18
Condition 18 was the same as Condition 16 except that the concentration of the aqueous solution of hydrofluoric acid in the acid cleaning step was 0.1%.

Condition 19
Condition 19 was the same as Condition 16 except that the concentration of the aqueous solution of hydrofluoric acid in the acid cleaning step was 1%.

Condition 20
Condition 20 was the same as Condition 16 except that the acid cleaning step in Condition 20 was performed using an aqueous solution of hydrofluoric acid of 0.025% plus sulfuric acid of 1%.

Condition 21
Condition 21 was the same as Condition 20 except that the concentration of sulfuric acid in the acid cleaning step was 5%.

Condition 22
Condition 22 was the same as Condition 20 except that the concentration of sulfuric acid in the acid cleaning step was 10%.

Example 5

In the Example 5, the method of the above-described fifth embodiment was performed under conditions 23 through 28 in Table 1.

Condition 23
In Condition 23, the drying treatment of the intermediate drying step S5 was omitted and the acid cleaning step S6 was performed. In the acid cleaning step, the substrate was dipped in an aqueous solution of hydrofluoric acid of 0.025% for 3 minutes, while rotating the substrate at 20 rpm to achieve a homogeneous treatment. The substrate then was rinsed thoroughly with pure water and air dried for 12 hours in the drying step S7. After that, electroless plating was performed in an electroless plating step S8. Other processes were the same as in the Condition 1.

Condition 24
In the Condition 24, the steps of the adhesion layer formation step S2 through the acid cleaning step S6 were repeated three times. Unheated air drying was conducted for 12 hours in the drying step S7 after the third acid cleaning treatment. After the other acid cleaning treatments, drying was not performed and the process was returned to the adhesion layer formation step S2. Other processes in Condition 24 were the same as in Condition 23.

Condition 25
Condition 25 was the same as Condition 24 except that the steps of the adhesion layer formation step S2 through the acid cleaning step S6 were repeated four times.

Condition 26
Condition 26 was the same as Condition 24 except that the steps of the adhesion layer formation step S2 through the acid cleaning step S6 were repeated five times.

Condition 27
Condition 27 was the same as Condition 24 except that the steps of the adhesion layer formation step S2 through the acid cleaning step S6 were repeated six times.

Condition 28
Condition 28 was the same as Condition 24 except that the steps of the adhesion layer formation step S2 through the acid cleaning step S6 were repeated seven times.

(Evaluation)

On the electroless plating film formed on glass substrates in the Examples described above, the external appearance was observed and blisters on the film were inspected. The results of the evaluation are given in Table 1.

TABLE 1

|  | *1) CN | drying treatment | | acid cleaning treatment | pH | *3) NR | *4) App | blisters |
|---|---|---|---|---|---|---|---|---|
|  |  | *2) unheated air drying | heated drying |  |  |  |  |  |
| Example 1 | 1 | 0 hr |  |  |  |  | Δ | observed |
|  | 2 | 0.5 hr |  |  |  |  | Δ | observed |
|  | 3 | 1 hr |  |  |  |  | Δ | observed |
|  | 4 | 6 hr |  |  |  |  | Δ | none |
|  | 5 | 12 hr |  |  |  |  | ○ | none |
| Example 2 | 6 |  | 60° C. 5 min |  |  |  | Δ | none |
|  | 7 |  | 60° C. 10 min |  |  |  | ○ | none |
|  | 8 |  | 80° C. 5 min |  |  |  | ○ | none |
|  | 9 |  | 100° C. 5 min |  |  |  | ○ | none |
|  | 10 |  | 150° C. 5 min |  |  |  | ○ | none |
|  | 11 |  | 200° C. 5 min |  |  |  | ▲ | none |
| Example 3 | 12 | 12 hr (12 hr) |  | hydrofluoric acid 0.025% | 3.15 | 1 | ▲ | none |
|  | 13 | 12 hr (12 hr) |  | hydrofluoric acid 0.025% | 3.15 | 2 | ▲ | none |
|  | 14 | 12 hr (12 hr) |  | hydrofluoric acid 0.025% | 3.15 | 3 | ○ | none |
|  | 15 | 12 hr (12 hr) |  | hydrofluoric acid 0.025% | 3.15 | 4 | ○ | none |

TABLE 1-continued

| | *1) CN | drying treatment *2) unheated air drying | heated drying | acid cleaning treatment | pH | *3) NR | *4) App | blisters |
|---|---|---|---|---|---|---|---|---|
| Example 4 | 16 | (12 hr) | 80° C. 5 min | hydrofluoric acid 0.025% | 3.15 | 1 | ○ | none |
| | 17 | (12 hr) | 80° C. 5 min | hydrofluoric acid 0.05% | 3.13 | 1 | ○ | none |
| | 18 | (12 hr) | 80° C. 5 min | hydrofluoric acid 0.1% | 3.06 | 1 | ○ | none |
| | 19 | (12 hr) | 80° C. 5 min | hydrofluoric acid 1% | 3.00 | 1 | ○ | none |
| | 20 | (12 hr) | 80° C. 5 min | hydrofluoric acid 0.025% + sulfuric acid 1% | 2.63 | 1 | ○ | none |
| | 21 | (12 hr) | 80° C. 5 min | hydrofluoric acid 0.025% + sulfuric acid 5% | 1.93 | 1 | X | none |
| | 22 | (12 hr) | 80° C. 5 min | hydrofluoric acid 0.025% + sulfuric acid 10% | 1.36 | 1 | X | none |
| Example 5 | 23 | 0 hr (12 hr) | | hydrofluoric acid 0.025% | 3.15 | 1 | ▲ | none |
| | 24 | 0 hr (12 hr) | | hydrofluoric acid 0.025% | 3.15 | 3 | ▲ | none |
| | 25 | 0 hr (12 hr) | | hydrofluoric acid 0.025% | 3.15 | 4 | ▲ | none |
| | 26 | 0 hr (12 hr) | | hydrofluoric acid 0.025% | 3.15 | 5 | ▲ | none |
| | 27 | 0 hr (12 hr) | | hydrofluoric acid 0.025% | 3.15 | 6 | ○ | none |
| | 28 | 0 hr (12 hr) | | hydrofluoric acid 0.025% | 3.15 | 7 | ○ | none |

*1) CN: Condition number
*2) unheated air drying: time in parenthesis shows duration in drying treatment step S7 after repeat
*3) NR: Number of repeat
*4) App: External appearance ○: good Δ: white stain spot observed ▲: partly lacking plating X: entirely failed plating Example 1 (Conditions 1 through 5) showed that unheated air drying for at least 6 hours is necessary to avoid blisters. The white stain spots observed in the external appearance occurred at locations on the substrate surface at which drying was insufficient, caused by remaining water. To avoid the white stain spot, the unheated air drying is conducted preferably for at least 12 hours.

Example 2 (Conditions 6 through 11) showed that heated drying at 60° C. or higher prevents blistering. To prevent the generation of a white stain spot, however, the heated drying at 60° C. must have a duration of at least 10 minutes. Heating at 200° C. resulted in a portion lacking plating. The failure of plating by the heating at 200° C. may be caused by deterioration of the catalyst layer or the adhesion layer.

Example 3 (Conditions 12 through 15) showed that an acid cleaning treatment after unheated air drying treatment of 12 hours results in failure of plating, but by repeating the processes three or more times, a plating film without any blisters and with a good appearance can be obtained.

Example 4 (Conditions 16 through 19) showed that an acid cleaning treatment after heated drying can provide a good plating film without repeating the processes. Example 4 (Conditions 20 through 22) confirmed that pH values smaller than 2 resulted in failure of plating, presumably caused by removal of the adhesion layer by the strong acid.

Example 5 (Conditions 23 through 28) showed that when acid cleaning was conducted without a preceding intermediate drying treatment, six or more repetitions of the adhesion layer formation step through the acid cleaning step were necessary.

Figure 2:
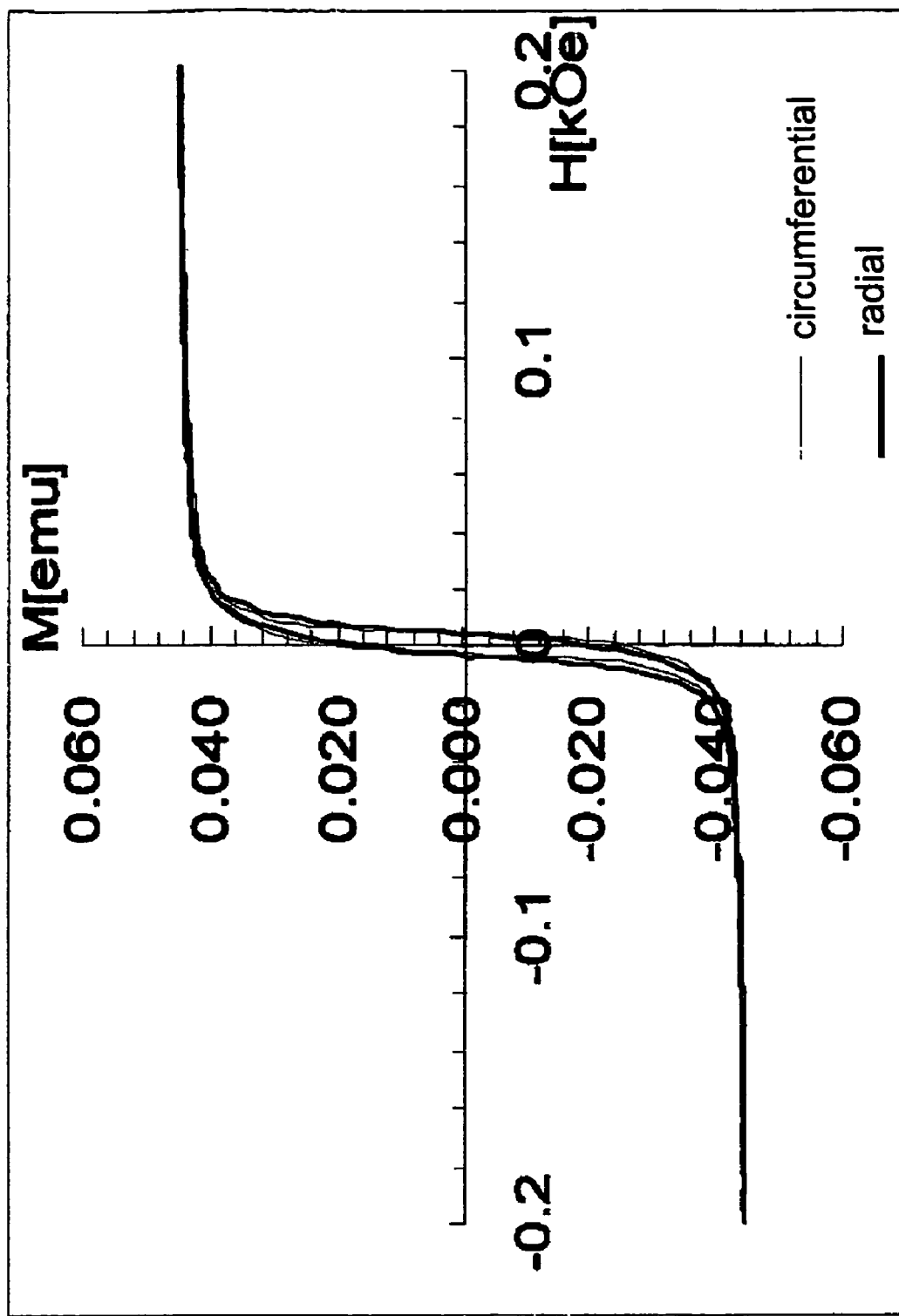
FIG. 2 shows a VSM loop measured by a VSM on the magnetic property of a soft magnetic film formed by electroless plating on a glass substrate by means of an embodiment of the method of plating on a glass substrate according to the invention.

Magnetic property was measured by VSM on the substrates having a CoNiP film formed on a glass substrate by electroless plating in Condition 5 of Example 1, Condition 8 of Example 2, Condition 14 of Example 3, Condition 16 of Example 4, Condition 20 of Example 4, and Condition 26 of Example 5, on all of which good evaluation results were exhibited in external appearance and blistering in the plated film. The CoNiP films of these plated substrates exhibited a good isotropic soft magnetic characteristic that is needed for use in perpendicular magnetic recording media. FIG. 2 shows a typical VSM loop.

Example of Method of Manufacturing Magnetic Recording Medium

Perpendicular magnetic recording media were manufactured in this example of a method of manufacturing a magnetic recording medium of the invention using the plated substrates in Condition 5 of Example 1, Condition 8 of Example 2, Condition 14 of Example 3, Condition 16 of Example 4, Condition 20 of Example 4, and Condition 26 of Example 5, which, as noted above, all exhibited good external appearance and soft magnetic characteristics. On each plated substrate surface flattening was performed by polishing, scrub cleaning was performed using neutral detergent and PVA sponge, alkali detergent cleaning was performed with 2% Semiclean pH=12, manufactured by Yokohama Oils and Fats Industry Co., Ltd., rinsing was performed using ultra pure water of more than 18 MΩ, and drying was performed with isopropyl alcohol vapor. After that, a chromium underlayer, a magnetic recording layer of Co—Cr—Pt—$SiO_2$, and a carbon protective layer were sequentially formed to obtain a perpendicular magnetic recording medium.

External appearance and adhesiveness were evaluated on these perpendicular magnetic recording media. The adhesiveness was evaluated by a cross-cut test prescribed in JIS K5600-3-4. The classification of the test results is shown in Table 2 and the evaluation results are given in Table 3.

TABLE 2 classification of cross-cut test results

| Level 1 | peeling with tape |
| --- | --- |
| Level 2 | peeling by cross-cut (2 mm × 2 mm) |
| Level 3 | peeling with tape after cross-cut |
| Level 4 | partial peeling with tape after cross-cut |
| Level 5 | no peeling after cross-cut |

TABLE 3

| | Appearance | blister | adhesiveness |
| --- | --- | --- | --- |
| Example 1 Condition 5 | ◯ | none | Level 5 |
| Example 2 Condition 8 | ◯ | none | Level 5 |
| Example 3 Condition 14 | ◯ | none | Level 5 |
| Example 4 Condition 16 | ◯ | none | Level 5 |
| Example 4 Condition 20 | ◯ | none | Level 5 |
| Example 5 Condition 26 | ◯ | none | Level 5 |

As shown in Table 3, it was been confirmed that every Condition had no problem in external appearance and adhesiveness.

What is claimed is:

1. A method of electroless plating of a plated layer onto a glass substrate having hydroxyl groups on its surface, the method comprising the steps of, in the order recited:
    forming an adhesion layer on a surface of the glass substrate using a solution containing a silane coupling agent comprised of silanol groups;
    forming a catalyst layer on the adhesion layer;
    performing a catalyst activation treatment on the adhesion layer; and
    strengthening adhesion of the adhesion layer by performing a drying treatment under conditions effective to cause the silane coupling agent in the adhesion layer to undergo dehydration condensation so that the silanol groups of the silane coupling agent chemically bond with the hydroxyl groups on the surface of the glass substrate; and
    performing an electroless plating.

2. The method of electroless plating on a glass substrate according to claim 1, wherein the catalyst layer is comprised of a catalyst which is palladium.

3. The method of electroless plating on a glass substrate according to claim 2, wherein the catalyst activation treatment treats the adhesion layer with hypophosphorous acid.

4. The method of electroless plating on a glass substrate according to claim 1, further comprising the step of acid cleaning between the step of the catalyst activation treatment and the drying treatment.

5. The method of electroless plating on a glass substrate according to claim 1, wherein between the step of performing a catalyst activation treatment and the step of performing a drying treatment, the method further comprises the steps of performing an intermediate drying of the adhesion layer; and acid cleaning the adhesion layer with an acid.

6. The method of electroless plating on a glass substrate according to claim 5, wherein the steps prior to the step of electroless plating are repeated sequentially plural times.

7. The method of electroless plating on a glass substrate according to claim 4, wherein the steps prior to the step of electroless plating are repeated sequentially plural times.

8. The method of electroless plating on a glass substrate according to claim 5, wherein the acid cleaning treatment is conducted using an acid solution having a pH of 2 or more and containing at least hydrofluoric acid.

9. The method of electroless plating on a glass substrate according to claim 4, wherein the acid cleaning treatment is conducted using an acid solution having a pH of 2 or more and containing at least hydrofluoric acid.

10. The method of electroless plating on a glass substrate according to claim 1, wherein the step of performing a drying treatment is a heated drying treatment conducted at a temperature ranging from of at least 60° C. to lower than 200° C.

11. A method of manufacturing a magnetic recording medium, comprising the steps of:
    a. providing a glass substrate having hydroxyl groups on a surface thereof;
    b. electroless plating a plated layer onto the surface of the glass substrate by a method comprised of the steps of, in the order recited:
        forming an adhesion layer on a surface of the glass substrate using a solution containing a silane coupling agent;
        forming a catalyst layer on the adhesion layer;
        performing a catalyst activation treatment on the adhesion layer; and
        strengthening adhesion of the adhesion layer by performing a drying treatment under conditions effective to cause the silane coupling agent in the adhesion layer to undergo dehydration condensation so that the silanol groups of the silane coupling agent chemically bond with the hydroxyl groups on the surface of the glass substrate; and
        performing an electroless plating to provide a plated layer; and
    c. forming at least a magnetic recording layer on the plated layer formed by electroless plating.

12. The method according to claim 11, wherein the catalyst layer is comprised of a catalyst which is palladium.

13. The method according to claim 12, wherein the catalyst activation treatment treats the adhesion layer with hypophosphorous acid.

14. The method according to claim 11, further comprising the step of acid cleaning between the step of the catalyst activation treatment and the drying treatment.

15. The method according to claim 11, wherein, between the step of performing a catalyst activation treatment and the step of performing a drying treatment, the method further comprises the steps of performing an intermediate drying of the adhesion layer; and acid cleaning the adhesion layer with an acid.

16. The method according to claim 15, wherein the steps prior to the step of electroless plating are repeated sequentially plural times.

17. The method according to claim 14, wherein the steps prior to the step of electroless plating are repeated sequentially plural times.

18. The method according to claim 15, wherein the acid cleaning treatment is conducted using an acid solution having a pH of 2 or more and containing at least hydrofluoric acid.

19. The method according to claim 14, wherein the acid cleaning treatment is conducted using an acid solution having a pH of 2 or more and containing at least hydrofluoric acid.

20. The method according to claim. 1, wherein the step of performing a drying treatment is a heated drying treatment conducted at a temperature ranging from at least 60° C. to lower than 200° C.

* * * * *